(12) United States Patent
Van Neste et al.

(10) Patent No.: US 6,842,254 B2
(45) Date of Patent: Jan. 11, 2005

(54) SYSTEM AND METHOD FOR MEASURING AN OPTICAL PATH DIFFERENCE IN A SENSING INTERFEROMETER

(75) Inventors: Richard Van Neste, Outremont (CA); Claude Belleville, L'Ancienne-Lorette (CA); Daniel Pronovost, Québec (CA); Alain Proulx, St-Étienne de Lauzon (CA)

(73) Assignee: Fiso Technologies Inc., Sainte-Foy (CA)

( * ) Notice: Subject to any disclaimer, the term of this patent is extended or adjusted under 35 U.S.C. 154(b) by 282 days.

(21) Appl. No.: 10/270,647

(22) Filed: Oct. 16, 2002

(65) Prior Publication Data

US 2004/0075841 A1 Apr. 22, 2004

(51) Int. Cl.[7] .................................................. G01B 9/02
(52) U.S. Cl. ...................................... 356/497; 356/479
(58) Field of Search ................................. 356/497, 479

(56) References Cited

U.S. PATENT DOCUMENTS

| | | | |
|---|---|---|---|
| 4,360,272 A | 11/1982 | Schmadel et al. | |
| 4,418,981 A | 12/1983 | Stowe | |
| 4,688,940 A | 8/1987 | Sommargren et al. | |
| 4,714,342 A | 12/1987 | Jackson et al. | |
| 4,755,668 A | 7/1988 | Davis | |
| 4,942,767 A | 7/1990 | Haritonidis et al. | |
| 5,166,751 A | * 11/1992 | Massig | 356/495 |
| 5,179,424 A | 1/1993 | Lequime et al. | |
| 5,200,796 A | 4/1993 | Lequime | |
| 5,202,939 A | 4/1993 | Belleville et al. | |
| 5,206,924 A | 4/1993 | Kersey | |
| 5,301,010 A | * 4/1994 | Jones et al. | 356/479 |
| 5,349,439 A | 9/1994 | Graindorge et al. | |

OTHER PUBLICATIONS

Claude Deslisle and Paolo Cielo,"Application de la modulation spectrale a la transmission de l'information", Can. J. Phys., 1974, pp. 1047–1053.

H.C. Lefevre,"White Light Interferometry in Optical Fiber Sensors", Proceedings of the 7th Optical Fibre Sensors Conference (OFS 7), 1990.

Th. Bosselmann and R. Ulrich, "High–Accuracy Position–Sensing with Fiber–Coupled White–Light Interferometers", Proceedings of the OFS 2, Germany, pp. 361–364.

"Two–Wavelength Interferometry", Applied Optics, 1973, vol. 12, No. 9, pp. 2071–2074.

M. Lequime and C. Lecot, "A dual–wavelength passive homodyne detection unit for fiber–coupled white–light interferometers", SPIE, vol. 1267, Fiber Optics Sensors IV, 1990, pp. 288–298.

H. R. Giovannini, D. Yeddou, and J. Huard,"Detection Scheme for white–light interferometric sensors", Optical Society of America, 1993, pp. 2074–2076.

* cited by examiner

*Primary Examiner*—Gregory J. Toatley, Jr.
*Assistant Examiner*—Patrick Connolly
(74) *Attorney, Agent, or Firm*—McDermott Will & Emery LLP

(57) ABSTRACT

An apparatus and a method of measuring an optical path difference in a sensing interferometer. Light from a source is directed in the sensing interferometer. The light reflected from the sensing interferometer is splitted into first and second beams respectively directed into two reference interferometers having optical path differences greater than the coherence length of the source and such that the optical signals are in quadrature. The intensities of the light transmitted by the reference interferometers and recombined light reflected from the reference interferometers are detected for measuring the optical path difference in the sensing interferometer. Additional light sources allow for correction of internal perturbations and absolute measurement of the optical path difference in the sensing interferometer.

52 Claims, 7 Drawing Sheets

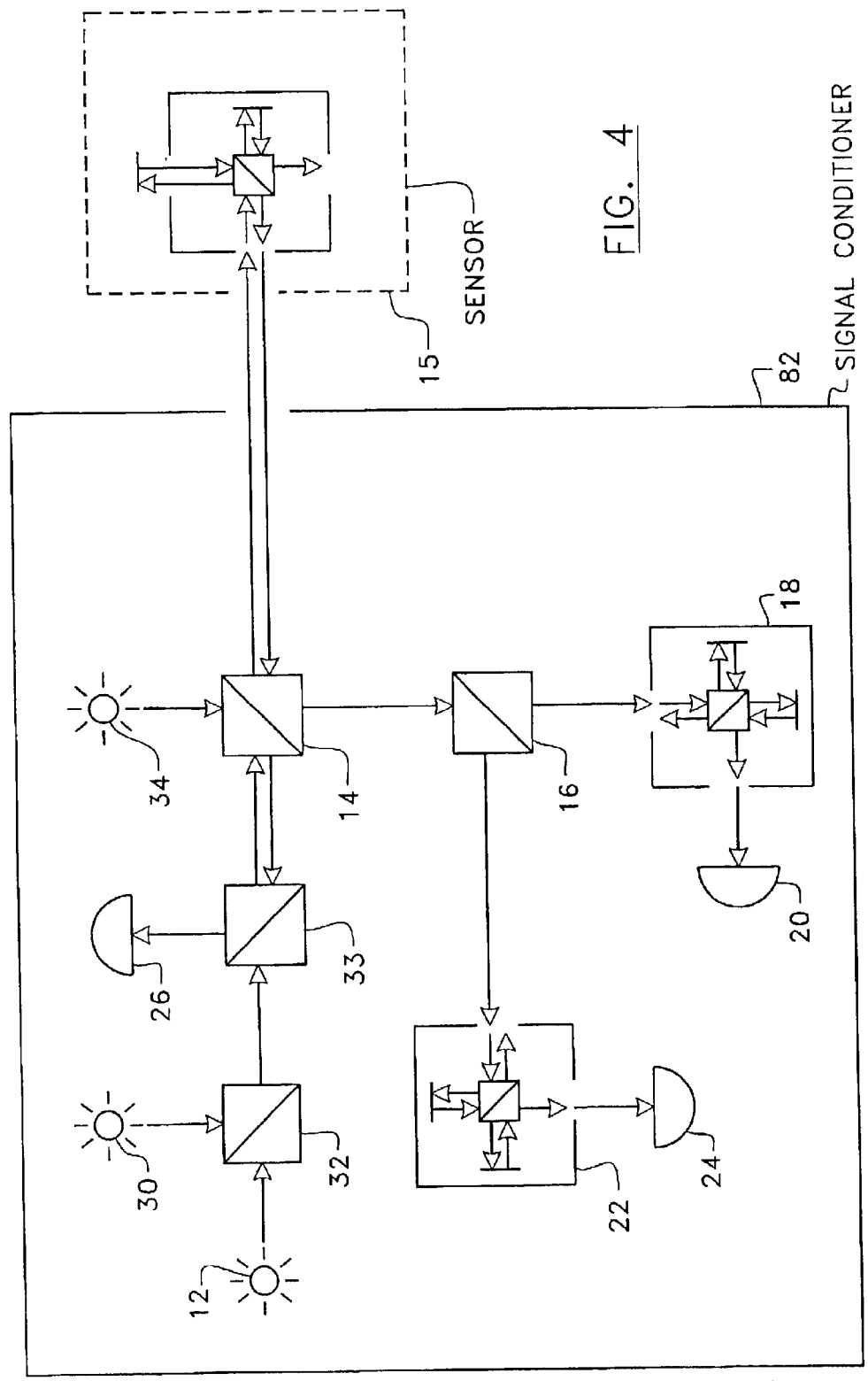

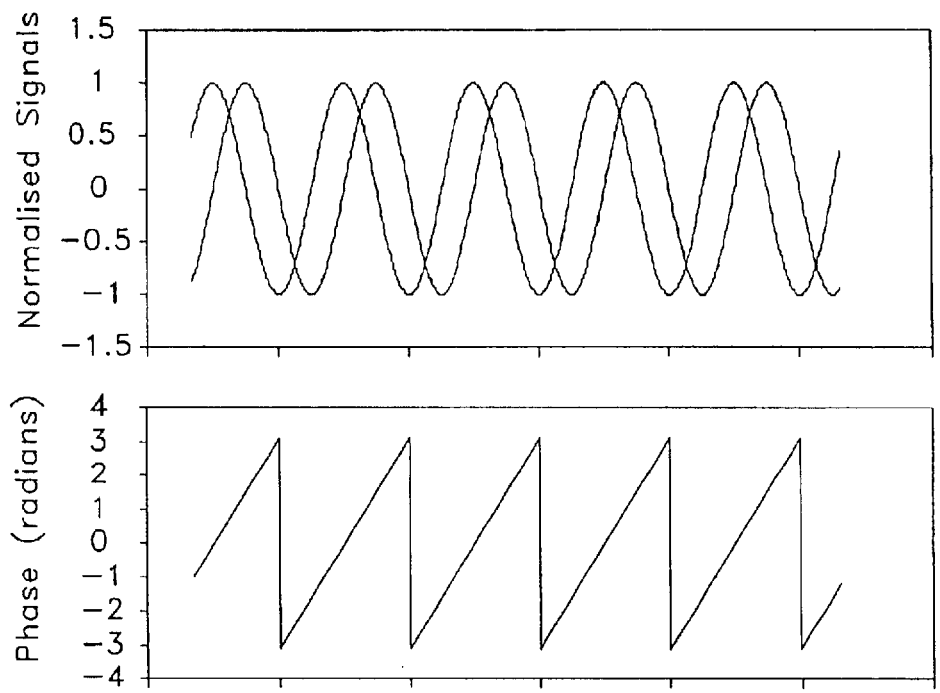
FIG. 5A
FIG. 5B
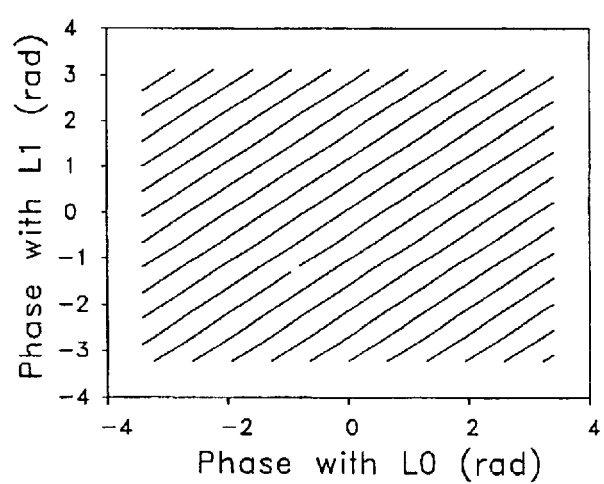
FIG. 6

SYSTEM AND METHOD FOR MEASURING AN OPTICAL PATH DIFFERENCE IN A SENSING INTERFEROMETER

FIELD OF THE INVENTION

The present invention relates to optical measuring instruments, and more particularly to a system and a method for measuring an optical path difference in a sensing interferometer used for example to sense a pressure, a temperature, a displacement, a stretching, a magnetic field, an electric current, etc.

BACKGROUND

The spectral response of a two-arm optical interferometer is a periodic function having a sinusoidal shape. The period of this function is inversely proportional to the difference in length between the two arms of the interferometer. This difference is called the optical path difference (OPD). Any perturbation on the length of any or both arms, whether by geometrical deformation of the interferometer or by perturbation in the optical path traveled by the light will change the period of the spectral response.

This property of optical interferometers to encode their OPD in the spectrum (or phase) of light is well known in the art and is often used to detect a variety of physical parameters, as shown in U.S. Pat. No. 4,714,342 (Jackson et al.), U.S. Pat. No. 4,360,272 (Schmadel et al.), U.S. Pat. No. 4,942,767 (Haritonidis et al.), U.S. Pat. No. 5,206,924 (Kersey), U.S. Pat. No. 4,688,940 (Sommargren et al.), U.S. Pat. No. 5,179,424 (Lequime et al.), U.S. Pat. No. 5,200,796 (Lequime), U.S. Pat. No. 5,349,439 (Graindorge et al.), U.S. Pat. No. 5,202,939 (Belleville et al.), and in the articles entitled "High accuracy position-sensing with fiber-coupled white-light interferometers", T. Bosselmann and R. Ulrich Proceedings of OFS 2 (Stuttgart), pp. 361–364 (1984), and "White-light interferometry in optical fiber sensors", H. C. Lefevre, Proceedings of the 7th Optical Fibre Sensors Conference (OFS 7), 1990.

One common example is the Michelson interferometer used in optical displacement sensor. In its simplest form, it consists of a laser source, a beam splitter, two mirrors and a detector. The light is first divided in two beams of different paths by the beam splitter. Each beam is then reflected back by a mirror along its path toward the beam splitter. The two beams then recombine and the resulting interference is incident on the detector. Since the laser emits a very narrow spectrum, in all practical manner a single frequency of light, the detector will sense an intensity that depends on the OPD of the interferometer. So if one mirror is kept at a fixed distance from the beam splitter (the reference arm), the light intensity measured by the detector will vary in a sinusoidal manner when the other mirror is moving (the measurement arm). Hence, if the intensity undergoes a variation that goes through a maximum, a minimum, and a maximum again, it means that the mirror has moved on a distance that is at least equal to half the wavelength of the light spectrum. Measuring the displacement is then a simple matter of counting pulses.

However, simple and elegant this method might appear, it suffers from several handicaps. First, one cannot tell if the mirror is moving in one direction or the other. Also, alignment variations or intensity variations of the source can severely affect the displacement reading, as these variations can be interpreted as a legitimate pulse.

Some of the problems in this arrangement can be alleviated by finding a way to add a second signal that would behave differently than the first to the movement of the mirror. Ideally, the two signals would share the same periodicity but with a phase offset of 90 degrees. One possibility is to use two orthogonal polarizations in the reference and measurement paths. The recombined light is then split in two beams again. One beam goes through a polarizer before entering the first detector. The other beam goes through a quarter-wave plate and a polarizer before entering the second detector. The two resulting signals are said to be in quadrature: when one signal is at its maximum, the other signal is half-way between its minimum and its maximum. Not only this quadrature system yields a sense of direction, but it also permits a higher degree of fringe interpolation. One can also employ a heterodyne scheme to further enhance this system and obtain more robustness to light source alignment variations. This can be accomplished by using a two-frequency laser and high-frequency phase detection electronics as shown in the aforementioned patent of Sommargren et al.

Although these refinements can lead to a very performing system, they add a lot of complexity and costs. And even with all these refinements, the use of narrow bandwidth laser sources makes this configuration an inherently relative measurement system. It only measures the displacement, i.e. the variation of distance, of the moving mirror. When this apparatus is first turned on, there is no way of telling what is the absolute OPD of the interferometer.

Another approach to the detection of the OPD of an interferometer takes advantage of the limited coherence length of a large spectral width source. The coherence length of light is inversely proportional to the spectral width. A simple implementation of this so-called white-light interferometry technique (see the article entitled "Application de la modulation spectrale à la transmission de l'information" C. Delisle and P. Cielo, Can. J. Phys., p. 1047 (1974), the aforementioned articles of T. Bosselmann et al. and of H. C. Lefevre, and the aforementioned US patent of Lequime) is illustrated in FIG. 1. Light from a broadband light source 2 is incident on a first interferometer 4 whose optical path difference OPD1 is greater than the coherence length of the light. Inside this first interferometer 4 (here represented as a Mach-Zehnder type), the coherence functions from the two arms do not overlap because of the difference between the two arms' length. Hence no interference can be seen at the output of the first interferometer 4. The interference can be recovered by the use of a second interferometer 6 for which the optical path difference OPD2 is close to OPD1 to within the coherence length of the light. This is illustrated in FIG. 1 where the leading lobe of the coherence function in the longest arm interferes with the lagging lobe of the coherence function in the shortest arm.

FIGS. 2A–B represent the intensity of light at the output of the second interferometer 6 (shown in FIG. 1) with respect to the variation of its OPD (i.e. OPD2) for two fixed different values of OPD1. When OPD2 is near zero, one can see an interference 8 which is only due to the fact that OPD2 is shorter than the coherence length. The period of these interference fringes 8 is equal to the central wavelength of the light spectrum. When OPD2 progresses toward higher values, this interference progressively disappears. When the value of OPD2 approaches that of OPD1, another interference pattern 10 appears, with a maximum visibility at the point where OPD2 is equal to OPD1. The period of this second set of interference fringes 10 is the same as the first interference, but the point of maximum visibility always corresponds to the centre of a fringe (whether a minimum or a maximum intensity, depending on the interferometer arrangement).

This arrangement suggests a simple way to devise an optical sensor system where the first interferometer (the sensing interferometer) is acting as a sensitive device against the parameter to be measured, whereas the second is used as a reference (or reading) interferometer. If the reading interferometer is made to vary its OPD in a known fashion, one can simply correlates the centre fringe position to the known OPD value to obtain the exact value of the OPD of the remote sensing interferometer.

Instead of time-scanning the reading interferometer, another scheme has been proposed where the light from the sensing interferometer is spread on the surface of a Fizeau interferometer. A Fizeau interferometer consists of two partially reflecting mirrors at a small angle with respect to each other. It can be seen as a continuous succession of low-finesse Fabry-Pérot interferometers where the cavity length varies as a function of the position along the wedge. An array of photo detectors placed behind the Fizeau interferometer will hence show a pattern similar to that of FIGS. 2A–B, the image of the pattern moving along the wedge as the sensing interferometer OPD varies (see the aforementioned US patents of Graindorge et al. and Belleville et al.).

This arrangement yields an absolute measure of the OPD of the sensing interferometer with a very high resolution. It is also very reliable because the demodulation instrument contains no moving part. However, the measurement speed of this system is limited by the slow response time of the detector array. It is also somewhat noisy because the light is inefficiently spread amongst the many detectors in the detector array.

SUMMARY

An object of the present invention is to provide a system and a method for measuring an optical path difference in a sensing interferometer, which have a very fast measurement speed and are cost-effective.

Another object of the present invention is to provide such a system and a method which are insensitive to any external perturbation on the optical signal.

Another object of the present invention is to allow a reliable measurement of the position inside a fringe without the need to change the cavity length of the sensing interferometer.

Another object of the present invention is to provide such a system capable of forming an absolute measurement instrument that is independent of the previous measurements and so departs from a mere fringe counting system.

Another object of the present invention is to provide such a system capable of further compensating for perturbations inside the demodulation system for making even more robust and reliable measurements.

According to the present invention, there is provided a system for measuring an optical path difference in a sensing interferometer, comprising:

at least one light source connectable to the sensing interferometer;

a splitting means connectable to the sensing interferometer for splitting light reflected from the sensing interferometer into first and second beams;

a first reference interferometer connected to the splitting means for receiving the first beam, the first reference interferometer having a predetermined optical path difference;

a first detector connected to the first reference interferometer for producing a signal indicative of an intensity of light transmitted by the first reference interferometer;

a second reference interferometer connected to the splitting means for receiving the second beam, the second reference interferometer having a predetermined optical path difference;

a second detector connected to the second reference interferometer for producing a signal indicative of an intensity of light transmitted by the second reference interferometer;

a recombining means connected to the first and second reference interferometers, for recombining light reflected from the first and second reference interferometers; and a third detector connected to the recombining means for producing a signal indicative of an addition of light recombined by the recombining means;

said at least one light source having a coherence length substantially smaller than the optical path differences of the sensing and reference interferometers, and the optical path differences of the reference interferometers being different so that the signals produced by the detectors connected to the reference interferometers are substantially in quadrature, whereby the signals produced by the detectors are indicative of the optical path difference in the sensing interferometer.

According to the present invention, there is also provided a system for measuring an optical path difference in a sensing interferometer, comprising:

at least one light source connectable to the sensing interferometer;

a splitting means connectable to the sensing interferometer for splitting light reflected from the sensing interferometer into first, second and third beams;

a first reference interferometer connected to the splitting means for receiving the first beam, the first reference interferometer having a predetermined optical path difference;

a first detector connected to the first reference interferometer for producing a signal indicative of an intensity of light transmitted by the first reference interferometer;

a second reference interferometer connected to the splitting means for receiving the second beam, the second reference interferometer having a predetermined optical path difference;

a second detector connected to the second reference interferometer for producing a signal indicative of an intensity of light transmitted by the second reference interferometer; and a third detector connected to the splitting means, for producing a signal indicative of the third beam;

said at least one light source having a coherence length substantially smaller than the optical path differences of the sensing and reference interferometers, and the optical path differences of the reference interferometers being different so that the signals produced by the detectors connected to the reference interferometers are substantially in quadrature, whereby the signals produced by the detectors are indicative of the optical path difference in the sensing interferometer.

According to the present invention, there is also provided a method of measuring an optical path difference in a sensing interferometer, comprising:

directing light in the sensing interferometer;

splitting light reflected from the sensing interferometer into first and second beams;

directing the first beam into a first reference interferometer having a predetermined optical path difference;

detecting an intensity of light transmitted by the first reference interferometer and producing a signal indicative of the intensity;

directing the second beam into a second reference interferometer having a predetermined optical path difference;

detecting an intensity of light transmitted by the second reference interferometer and producing a signal indicative of the intensity;

recombining light reflected from the first and second reference interferometers; and detecting an addition of light resulting from the recombining and producing a signal indicative of the addition of light;

the light directed in the sensing interferometer having a coherence length substantially smaller than the optical path differences of the sensing and reference interferometers, and the optical path differences of the reference interferometers being different so that the signals based on the intensities of light transmitted by the reference interferometers are substantially in quadrature, whereby the signals are indicative of the optical path difference in the sensing interferometer.

According to the present invention, there is also provided a method of measuring an optical path difference in a sensing interferometer, comprising:

directing light in the sensing interferometer;

splitting light reflected from the sensing interferometer into first, second and third beams;

directing the first beam into a first reference interferometer having a predetermined optical path difference;

detecting an intensity of light transmitted by the first reference interferometer and producing a signal indicative of said intensity;

directing the second beam into a second reference interferometer having a predetermined optical path difference;

detecting an intensity of light transmitted by the second reference interferometer and producing a signal indicative of said intensity; and detecting an intensity of the third beam and producing a signal indicative of said intensity;

the light directed in the sensing interferometer having a coherence length substantially smaller than the optical path differences of the sensing and reference interferometers, and the optical path differences of the reference interferometers being different so that the signals based on the intensities of light transmitted by the reference interferometers are substantially in quadrature, whereby the signals are indicative of the optical path difference in the sensing interferometer.

The following provides a non-restrictive summary of certain features of the invention which are more fully described hereinafter.

The system and method of the present invention provide a new way of demodulating the light from an interferometer so that one can measure its optical path difference (OPD). The method uses the principle of white-light interferometry to generate two signals in quadrature, as well as a third composite signal.

As explained hereinabove, an interferometric sensor design can be used as a simple fringe-counting detector. Having two signals in quadrature from the output of the sensing interferometer helps to alleviate the problems of obtaining the sense of direction. But even then, this does not permit a reliable interpolation inside a fringe. Also, light losses or intensity variation would still be associated to a change in the interferometric sensor.

The use of three detectors altogether to demodulate the optical signal, according to the present invention, overcomes this drawback. The use of a third detector, reading a composite signal generated by the two reference interferometers, makes the system insensitive to external perturbations of the optical signal and thus, allows for precise and reliable fringe interpolation. Without this third detector, the system would be reduced to a simple fringe counting system, making it a coarse, unreliable and imprecise instrument. Also, risks of erroneous fringe counts, which may occur as a result of light intensity fluctuations due to external perturbations, is eliminated.

The use a second light source with a different wavelength, according to the present invention, can lead to a quasi-absolute system. The addition of the second light source allows an identification in real-time of the fringe number. The system thus departs from a fringe counting system by making it an absolute measurement instrument which is independent of the previous measurements.

In a nutshell, if the third detector allows answering the question "Where are we inside that fringe?", the second light source answers the question "On what fringe are we on?".

The addition of a third light source, according to the present invention, can be used to further compensate for perturbations inside the demodulation system for making even more robust and reliable measurements.

BRIEF DESCRIPTION OF THE DRAWINGS

A detailed description of preferred embodiments will be given herein below with reference to the following drawings, in which like numbers refer to like elements:

FIG. 4 is a schematic diagram illustrating another embodiment of the system according to the present invention.

FIGS. 5A–B are graphs respectively representing normalized signals and recovered phase information as the optical path difference is changed in the sensing interferometer.

FIG. 6 is a graph showing a parametric representation of the optical path difference as a function of the wavelengths of the light sources on a phase-plane defined by the phase of the modulation of the light derived from the light sources.

DETAILED DESCRIPTION OF THE PREFERRED EMBODIMENTS

Figure 3:
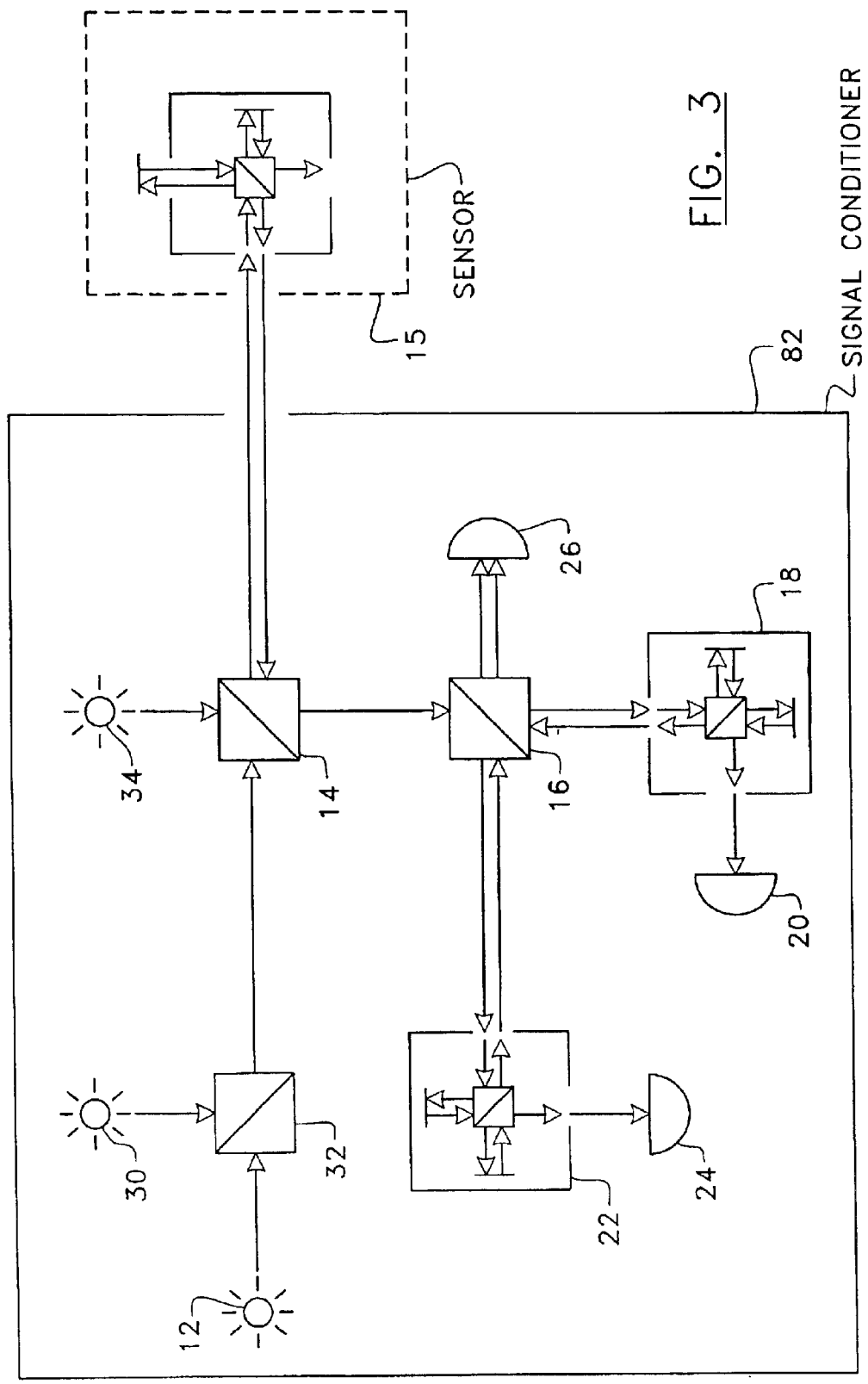
FIG. 3 is a schematic diagram illustrating an embodiment of the system according to the present invention.

Referring to FIG. 3, there is shown an embodiment of the system according to the present invention. A limited version of the system may comprise a single light source 12 preferably having a large spectrum (such as an electro luminescent diode). Light generated by the light source 12 goes through a first beam splitter 14 and is directed to a remote sensing interferometer 15. The sensing interferometer 15 (or sensor) is here represented as a Michelson-type but it could be any type of two-arm interferometer, such as a low-finesse Fabry-Perot. The reflected light from the sensing interferometer 15, which encodes in its spectrum all the information one needs to measure its optical path difference (OPD), then goes back to the first beam splitter 14 and is directed to a second beam splitter 16. There, the light signal is split in two beams. A first beam goes through a first reference interferometer 18. The intensity of the light transmitted by the interferometer 18 is measured by a photo detector 20. Here, the transmitted light is encoded by both the sensor 15 and the reference interferometer 18. Similarly, the second beam goes through a second reference interferometer 22 and its transmitted light is measured by a photo detector 24. Finally, the reflected light from the two reference interferometers 18, 22 is recombined in the beam splitter 16 and the (incoherent) addition of these two signals is measured by a photo detector 26. In a typical sensing application, the sensing interferometer 15 will be in a remote location. It will act as a transducer for sensing a given environmental parameter. All the other parts of the system will act as a signal conditioner, packed with all the electronics and user interface for demodulating the signal from the transducer and converting it to a usable measurement value. Although the illustrated system uses the same optical elements for splitting, recombining and guiding the light beams, separate optical elements could of course be used if desired.

In practice, the optical source spectral distribution can be approximated by a Gaussian curve:

$$G(v) = \frac{P}{\sqrt{\pi w^2}} e^{-(\frac{v-v_0}{w})^2} \quad (1)$$

where $v$ is the optical frequency, $v_0$ is the central frequency, $w$ is the 1/e spectral width and P is the total power of the light source 12 injected into the system.

The transmission transfer function of a two-path interferometer with respect to its OPD and the optical frequency can be expressed as:

$$T(v, d) = \alpha_t + \beta_t \cos\left(\frac{4\pi v d}{c}\right) \quad (2)$$

where $2d$ is the OPD of the interferometer, $\alpha_t$ and $\beta_t$ are response parameters that take into account all losses, splitting ratios and reflectivity values of the interferometer. Maximum visibility of the fringes is attained when $\alpha=\frac{1}{2}$ and $\beta=\frac{1}{2}$.

The reflection transfer function is the reciprocal of the transmission function:

$$R(v, d) = \alpha_r - \beta_r \cos\left(\frac{4\pi v d}{c}\right) \quad (3)$$

So if we follow the path from the light source 12 up to the sensing interferometer 15 and then down to the output of the reference interferometer 18, the light spectrum at the detector 20 can be expressed as:

$$T_{r0}(v, d_{r0}) \cdot R_s(v, d_s) \cdot G(v)$$

where $T_{r0}$ is the transmission transfer function of the interferometer 18, $d_{r0}$ is half the OPD of the interferometer 18, $R_s$ is the reflection transfer function of the sensing interferometer 15, $d_{rs}$ is half the OPD of the sensing interferometer 15 and all losses and splitting ratios are taken into account via the $\alpha$ and $\beta$ parameters. Assuming that the detector 20 with its electronic circuitry has a flat optical response, it will generate a signal that is proportional to the total optical power received integrated over the whole spectrum:

$$s_0(d_s, d_{r0}) = g_0 \int T_{r0}(v d_{r0}) R_s(v, d_s) G(v) dv \quad (4)$$

where $g_0$ is the electro-optical conversion (or gain) factor for the detector 20. Carrying the integration on equation (4) yields the same curve shown in FIG. 2.

The coherence length $l_c$ for a Gaussian light spectrum can be defined as:

$$l_c = \frac{c}{2w}$$

To obtain proper results, the OPD for both the sensing and the reference interferometers 15, 18 should be significantly higher than the coherence length of the source 12, i.e. $2d_s \gg l_c$ and $2d_{r0} \gg l_c$. Hence, all terms in $\exp(-d^2/l_c^2)$ from the integration (4) can be ignored, so the resulting signal has only two terms:

$$s_0(d_s, d_{r0}) = g_0 P \left\{ \alpha_0 \alpha_s - \frac{1}{2} \beta_0 \beta_s \cos\left(\frac{4\pi v_0 (d_s - d_{r0})}{c}\right) e^{-\left(\frac{2(d_s-d_{r0})}{l_c}\right)^2} \right\} \quad (5)$$

where all losses and splitting ratios along the path from the output of the beam splitter 16 down to the detector 20 and also the reference interferometer response parameters have been included in $\alpha_0$ and $\beta_0$.

The same development applies to the signal generated at the detector 24:

$$s_1(d_s, d_{r1}) = g_1 P \left\{ \alpha_1 \alpha_s - \frac{1}{2} \beta_1 \beta_s \cos\left(\frac{4\pi v_0 (d_s - d_{r1})}{c}\right) e^{-\left(\frac{2(d_s-d_{r1})}{l_c}\right)^2} \right\} \quad (6)$$

Figure 1:
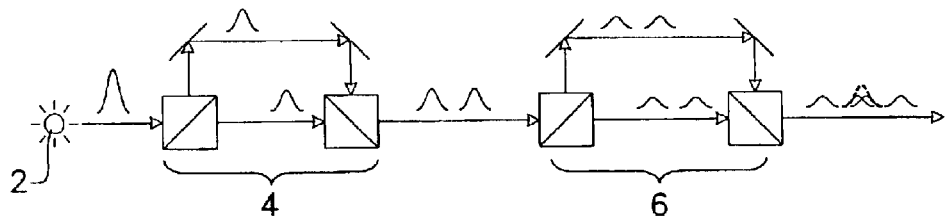
FIG. 1 is a schematic diagram illustrating the principle of white-light interferometry technique.
Figure 2A:
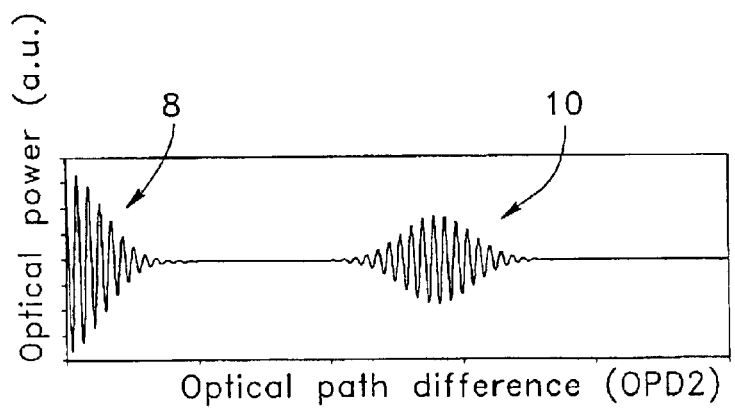
FIGS. 2A–B are graphs respectively representing an intensity of light at an output of the second interferometer with respect to its optical path difference for two different fixed values of optical path difference of the first interferometer shown in FIG. 1.
Figure 2B:
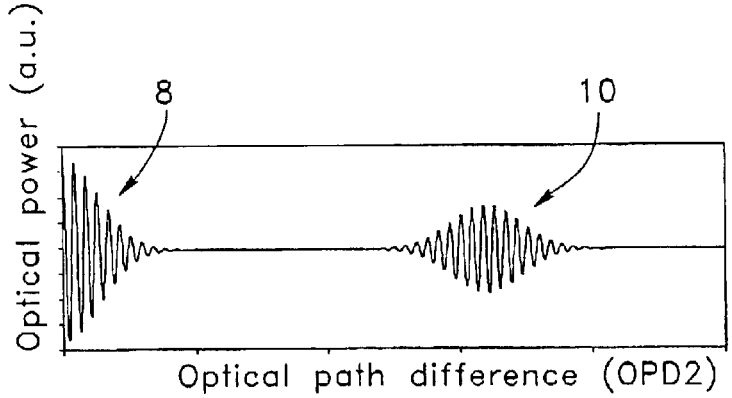

Equations (5) and (6) are the mathematical expression of the 1st-order interference pattern shown in FIGS. 2A–B past the zero axis. The 0th-order close to the zero axis has been ruled out by our assumption that the OPDs are higher than the coherence length.

The periodic components of signals $s_0$ and $s_1$ are in quadrature if their phase difference is 90°, or $\pi/2$. This will be the case if the difference between the OPD of the reference interferometer 18 and the OPD of the reference interferometer 22 is by an amount equal to the quarter of the central wavelength $\lambda_0$ of the light source 12. This is expressed as:

$$2d_{r1} - 2d_{r0} = \frac{\lambda_0}{4}$$

Knowing that $v\lambda \equiv c$, the periodic component of eq. (6) can be transformed to:

$$\cos\left(\frac{4\pi v_0 (d_s - d_{r1})}{c}\right) = \cos\left(\frac{4\pi v_0 (d_s - d_{r0} - (d_{r1} - d_{r0}))}{c}\right) = \sin\left(\frac{4\pi (d_s - d_{r0})}{\lambda_0}\right)$$

Hence, eq. (5) and (6) can then be rewritten:

$$s_0(\Delta d) = g_0 P \left\{ \alpha_0 \alpha_s - \frac{1}{2} \beta_0 \beta_s \cos\left(\frac{4\pi \Delta d}{\lambda_0}\right) e^{-\left(\frac{2\Delta d}{l_c}\right)^2} \right\} \quad (7)$$

and $$s_1(\Delta d) = g_1 P \left\{ \alpha_1 \alpha_s - \frac{1}{2} \beta_1 \beta_s \sin\left(\frac{4\pi \Delta d}{\lambda_0}\right) e^{-\left(\frac{2\Delta d}{l_c}\right)^2} \right\} \quad (8)$$

where $\Delta d = d_s - d_{r0}$. We also have assumed that $d_s - d_{r1} \cong \Delta d$ in the exponential term. This is a reasonable approximation when the coherence length of the source is much higher than the central wavelength. From now on, we will only consider the measurement of $\Delta d$ to simplify the discussion, assuming that $d_{r0}$ is known so that $d_s$ can be derived from the result.

Recovering $\Delta d$ is then possible by a standard quadrature demodulation technique if the values $\lambda_0$, $g_0 P \alpha_0 \alpha_s$, $g_1 P \alpha_1 \alpha_s$, $g_0 \beta_0$ and $g_1 \beta_1$ are known and by using the property that $\cos(x)^2 + \sin(x)^2 = 1$. Unfortunately, it is not feasible, on a practical point of view, to find reliable calibration values for these parameters, except for $\lambda_0$. One of the reasons for this is the fact that we cannot rely on the sensing interferometer parameters $\alpha_s$ and $\beta_s$ to remain stable over time, as it will generally be in a remote location from the rest of the system (the signal conditioner). Hence these parameters can be severely affected by losses and perturbations that arose from changing environmental conditions. Moreover, it is highly desirable that the signal conditioner be able to demodulate signals from different but interchangeable transducers, each having its own $\alpha_s$ and $\beta_s$ parameters. As a consequence, we have to consider from now on that $\alpha_s$ and $\beta_s$ are unknown values that must be compensated for dynamically. We will also assume that the source optical power P can change over time.

This is when the third detector 26 comes into play. The use of a third detector allows a precise fringe interpolation by making the system insensitive to any external perturbation on the optical signal. Without the third detector 26, the system would be reduced to simple fringe counting, making it a coarse, unreliable and imprecise instrument. The judicious use of a third detector, as explained in the following sections, is one of the key features of the present invention.

The optical signal reaching the detector 26 is the sum of the light reflected from the two reference interferometers 18, 22. These two light signals are recombined in an incoherent fashion in the beam splitter 16 at the condition that the difference between the optical path leading from the beam splitter 16 to the reference interferometer 18 and the optical path leading from the beam splitter 16 to the reference interferometer 22 is much higher than the coherence length of the source 12. This condition is easily met practically since the coherence length from a typical broadband light source is in the order of a few micrometers.

We can use the same development that was carried for $s_0$ and $s_1$ but this time using eq. (3) for the reference interferometers contribution, as they now act in reflection:

$$s_2(d_s, d_{r0}, d_{r1}) = g_2 \int [a R_{r0}(\nu d_{r0}) + b R_{r1}(\nu, d_{r1})] R_s(\nu, d_s) G(\nu) d\nu$$

where a and b are introduced to take into account the fact that the contribution from the reference interferometers 18, 22 is not necessarily of equal importance. Carrying the integration with the same assumptions as previously, we end up with a third composite signal:

$$s_2(\Delta d) = g_2 P \left\{ \alpha_2 \alpha_s + \frac{1}{2} \beta_2 \beta_s \left[ a \cos\left(\frac{4\pi \Delta d}{\lambda_0}\right) + b \sin\left(\frac{4\pi \Delta d}{\lambda_0}\right) \right] e^{-\left(\frac{2\Delta d}{l_c}\right)^2} \right\} \quad (9)$$

where $\alpha_2$ and $\beta_2$ incorporate all losses along the paths from the reference interferometers 18, 22 to the detector 26.

With the signals $s_0$, $s_1$ and $s_2$, we have all the information needed to recover $\Delta d$ independently of $\alpha_s$, $\beta_s$ and P. The first step is to find a way to eliminate the dc (or non-periodic) values from eq. (7) and (8). This may be accomplished by first noting that eq. (7), (8) and (9) lead to:

$$P \alpha_s = \frac{\frac{a}{g_0 \beta_0} s_0 + \frac{b}{g_1 \beta_2} s_1 + \frac{1}{g_2 \beta_2} s_2}{\frac{a \alpha_0}{\beta_0} + \frac{b \alpha_1}{\beta_1} + \frac{\alpha_2}{\beta_2}} \quad (10)$$

If the values on the right-hand side of eq. (10) are known, and we do suppose so because all these parameters depend only on the internal environment of the signal conditioner (except for $s_0$, $s_1$ and $s_2$ that we read in real-time), so they can be calibrated. Then we can dynamically calculate $P \alpha_s$ and use this value to compute the ac signals:

$$s_{ac0}(\Delta d) = \frac{s_0(\Delta d) - g_0 \alpha_0 P \alpha_s}{g_0 \beta_0} = -\frac{1}{2} P \beta_s \cos\left(\frac{4\pi \Delta d}{\lambda_0}\right) e^{-\left(\frac{2\Delta d}{l_c}\right)^2} \quad (11)$$

and $$s_{ac1}(\Delta d) = \frac{s_1(\Delta d) - g_1 \alpha_1 P \alpha_s}{g_1 \beta_1} = -\frac{1}{2} P \beta_s \sin\left(\frac{4\pi \Delta d}{\lambda_0}\right) e^{-\left(\frac{2\Delta d}{l_c}\right)^2} \quad (12)$$

The common factor in eq. (11) and (12) can be eliminated by using the trigonometric property $\cos(x)^2 + \sin(x)^2 = 1$ so we are left with the normalized signals:

$$s_{n0}(\Delta d) = \frac{s_{ac0}(\Delta d)}{\sqrt{s_{ac0}(\Delta d)^2 + s_{ac1}(\Delta d)^2}} = \cos\left(\frac{4\pi \Delta d}{\lambda_0}\right) \quad (13)$$

and $$s_{n1}(\Delta d) = \frac{s_{ac1}(\Delta d)}{\sqrt{s_{ac0}(\Delta d)^2 + s_{ac1}(\Delta d)^2}} = \sin\left(\frac{4\pi \Delta d}{\lambda_0}\right) \quad (14)$$

From now on, the real-time computed normalized values from eq. (13) and (14) give two signals in quadrature normalized between −1 and +1 that are only dependent on the OPD difference $\Delta d$ between the sensing interferometer 15 and the first reference interferometer 18.

It is important to note that this detection scheme is independent of any external effect influencing the amplitude, offset or visibility of the fringes in the optical signal from the transducer (the sensing interferometer 15). This 10 independence on the signal quality is obtained, and that is one of the features of the present invention, by taking into account the information from the third photo detector 26 that yields a composite signal from the two reference interferometers 18, 22.

Referring to FIG. 4, alternatively, the approach for using a third detector 26 can be simplified by adding another beam splitter 33 as illustrated. Here, the detector 26 directly senses a constant portion of the total light returning from the sensing interferometer 15:

$$s_2(\Delta d) = g_2 P \alpha_2 \alpha_s$$

Hence, in such a system, we will simply use $$P\alpha_s = \frac{s_2}{g_2 \alpha_2}$$

instead of eq. (10) for computing the ac signals of eq. (11) and (12). But this approach has two drawbacks. First, another beam splitter 33 is required. Second, the possibility of compensating for the coupling parameters variations of the beam splitter 33 using the arrangement introduced hereinafter is lost.

A standard quadrature demodulation technique can now be used to recover $\Delta d$. It is clear from eq. (13) and (14) that the phase of the modulation:

$$\varphi = \frac{4\pi \Delta d}{\lambda_0} - 2n\pi \quad (15)$$

can be unambiguously recovered from the inverse tangent of $s_{n1}$ over $s_{n0}$. In eq. (15), n is a real number that takes into account the periodicity of the response such that $\phi$ is comprised between $-\pi$ and $+\pi$.

FIGS. 5A–B show the relationship of the normalized signals and the phase angle with respect to the OPD difference $\Delta d$.

If the signals are sampled and processed fast enough, one can track the evolution of the modulation phase and hence solve eq. (15) for $\Delta d$. The integer value n in this equation simply represents the fringe number. This number is tracked during the whole measurement session, starting (arbitrarily) at n=0 for the first measurement, adding 1 to n when the phase $\phi$ undergoes a transition from $+\pi$ to $-\pi$, and subtracting 1 when $\phi$ goes from $-\pi$ to $+\pi$. Hence, this configuration is inherently a relative system, as the absolute value of the OPD difference cannot be known without information on its past history. To make it absolute, n must be measured independently from the past measurements.

Referring back to FIG. 3, a second light source 30 can be used to determine in real-time the fringe number n. The second light source 30 can be added by means of a supplemental beam splitter 32. A third light source 34 (which may also be referred to as a calibration light source for reasons that will become apparent hereinafter) can also be added in the unused arm of beam splitter 14. The sources 12, 30, 34 are intended to be used in sequence, turning them on and off as needed. At any time, there should be only one light source in function.

The second light source 30 should be chosen to have a central wavelength $\lambda_1$ different from the wavelength $\lambda_0$ of the first light source 12. The addition of a second wavelength provides the information to get the absolute value of the OPD difference $\Delta d$ (within a certain interval, as seen hereinafter).

At any given time $t_0$, the source 12 is switched on, the source 30 is switched off and the signals $s_{00}(\Delta d_0)$, $s_{10}(\Delta d_0)$ and $s_{20}(\Delta d_0)$ are sampled and kept in memory. Shortly after, the source 12 is switched off, the source 30 is switched on and $s_{01}(\Delta d_1)$, $s_{11}(\Delta d_1)$ and $S_{21}(\Delta d_1)$ are sampled and kept in memory. The calculations expressed by eq. (10) to (14) can then be carried independently with these two sets of data. If the time interval separating $t_1$ from $t_0$ is much smaller than the time that $\Delta d$ takes to change significantly, we can consider that $\Delta d_0 = \Delta d_1 = \Delta d$. The two calculations will lead to two different phase values:

$$\varphi_0 = \frac{4\pi \Delta d}{\lambda_0} - 2n_0 \pi \quad (16a)$$

and $$\varphi_1 = \frac{4\pi \Delta d}{\lambda_1} - 2n_1 \pi \quad (16b)$$

The only thing needed here to obtain an absolute measurement of $\Delta d$ is a correct value of the fringe number $n_0$ or $n_1$.

FIG. 6 shows a parametric representation of $\Delta d(\lambda_0^1, \lambda_1)$ drawn on a phase plane defined by $\phi_0$ on the horizontal axis and $\phi_1$ on the vertical axis. Each point of this graph represents a different value of $\Delta d$. Hence, obtaining the value of $\Delta d$ is simply a matter of resolving the set of equations represented in (16a and b).

Even then, however, the behaviour of the system is still periodic. But the period here has been considerably extended. It can be shown that the parametric representation of $\Delta d$ will repeat itself after an excursion equal to:

$$\Delta d_{range} = \frac{\lambda_0 \lambda_1}{\lambda_1 - \lambda_0} \quad (17)$$

To put things into perspective, we can take the example of the source 12 (see FIG. 3) having a center wavelength $\lambda_0$ of 850 nm and the source 30 (see FIG. 3) having a center wavelength $\lambda_1$ of 780 nm. The periodicity given by eq. (17) is 9.47 micrometers for the combined result, instead of 0.425 or 0.390 micrometer if the source 12 or the source 30 was to be used alone. It gives a validity range within which the OPD difference can be unambiguously determined. Strictly speaking, this does not provide an absolute reading of the sensing interferometer OPD. But because the period of the response has been considerably extended, and if the sensing interferometer 15 is made such that its OPD does not change more than this validity range, we end up practically with an absolute reading.

Keeping the same values of $\lambda_0$ and $\lambda_1$ as an example, one can compute that for an excursion of:

$$-\frac{\Delta d_{range}}{2} < \Delta d \le \frac{\Delta d_{range}}{2},$$

the possible values for no range from $-11$ to $+11$ and the values for $n_1$ range from $-12$ to $+12$. It gives a set of 47 different possible pairs of fringe numbers $(n_0, n_1)$: $(-11, -12), (-11, -11), (-11, -10), \ldots, (11, 10), (11, 11) (11, 12)$. Equations (16a and b) must be tried with the measured values of $\phi_1$ and $\phi_2$ for each possible pair. There will be only one set of results yielding an equal value of $\Delta d$. But in practice, because of noise and errors in the measurement of $\phi_1$ and $\phi_2$, the equations (16a and b) will yield slightly different values of $\Delta d$. In this case, the most reasonable solution $(n_0, n_1)$ will be the one that yields the smallest difference between the found values. Once the correct fringe numbers $(n_0, n_1)$ have been determined, one can simply choose to solve either equation (16a) or (16b) for $\Delta d$ using the appropriate fringe number. In fact, we already did that when we calculated $\Delta d$ for all possible pairs of fringe numbers. We could also choose to use the mean value of both $\Delta d$ found in eq. (16a) and (16b). This could have some advantages on the linearity and noise of the measurements.

In a practical implementation of this scheme, we can choose to lit up the second source 30 at every new reading, so that we have an absolute measurement in real-time. But this of course doubles the time required to do all calculations for one measurement. In most situations involving the dynamic measurement of physical processes, it is not necessary to have an absolute measurement at all time. It can be desirable to make an absolute measurement only at the beginning of the process and then go on with a relative measurement starting with the initial absolute value. In this case, one can choose to lit up the second source 30 only when required, thus saving the expense of the extra calculation time for the rest of the acquisition which will result in a considerable increase of the measurement rate.

It is also worth mentioning that it might be necessary to have different calibration values of the fixed parameters a, b, $\alpha_0$, $\alpha_1$, $\alpha_2$, $\beta_0$, $\beta_1$, $\beta_2$, $g_0$, $g_1$, $g_2$ and even $d_{r0}$ for the two sets of calculations carried with the results of the first and second sources 12, 30 since the optical components in the system can have different losses and behaviour if the wavelength interval between the two sources 12, 30 is large.

Referring back to FIG. 4, alternatively, an additional light source 30 can be used to determine in real-time the fringe number n, using the same method as described above for obtaining the absolute value of the OPD difference $\Delta d$ (within a certain interval, as seen above). The light source 30 can be added by means of a supplemental beam splitter 32. The sources 12, 30, 34 are intended to be used in sequence, turning them on and off as needed. At any time, there should be only one light source in function.

Until now, we have only considered the case when the calibration parameters a, b, $\alpha_0$, $\alpha_1$, $\alpha_2$, $\beta_0$, $\beta_1$, $\beta_2$, $g_0$, $g_1$, $g_2$, $\lambda_0$, $\lambda_1$, $d_{r0}$ and $d_{r1}$ remain constant over time. But for some of these parameters, this may sometimes not be the case.

It is reasonable to assume that the $\alpha/\beta$ ratio remain constant since this value only depends on the visibility of the fringes from the reference interferometers 18, 22, which can be built in a very stable manner. We also make the reasonable assumption that $\lambda_0$, $\lambda_1$ and $d_{r0}$ are also constants.

But experimental tests have shown that the main contribution to the variation of the calibration parameters comes from the beam splitter 16, where a variation in its coupling ratios can severely affect the outcome of the calculations, completely ruining the quadrature detection and preventing the signals from being properly normalized.

On the other side, experimental tests have also shown that in all reasonable circumstances, the beam splitter 16 behaves symmetrically. This means that we only have to take into account two (possibly variable) different coupling ratios: one for the direct pass (for a cube beam-splitter: when the output beam is directly transmitted) and another for the indirect pass (for a cube beam-splitter: when the output beam undergoes one reflection), whatever the direction and whatever the input arm. The immediate and very important consequence of this is: the coefficients a, b remain unchanged because they both depend on an optical signal making a round-trip in the beam-splitter, one passes on the direct path and the other passes on the indirect path. This common variable contribution can thus be singled out off the parenthesis of eq. (9) into the $\beta_2$ parameter.

So we are left with only three variables to compensate. This can be done with the information collected from lighting up the third source 34 (and shutting down the first and second sources 12, 30). It is done a first time during the calibration procedure (say, at time t=0) of the system. It can be shown that the control signals read at the detectors 20, 24, 26 are proportional to their respective a parameter:

$$S_{c0}(0)=g_0(t)\alpha_c(0)\alpha_0(0),\ S_{c1}(0)=g_1(t)\alpha_c(0)\alpha_1(0)\text{ and }S_{c2}(0)= g_2(t)\alpha_c(0)\alpha_2(0),$$

where the common time-dependent factor $\alpha_c(t)$ depends only on the optical power of the second source 34 and on the losses encountered in and around the first beam splitter 14.

The small contribution coming from the sensing interferometer 15 has been neglected. It comes from the light of the third source 34 that is reflected from the reference interferometers 18, 22 up to the sensor 15, and then back again down to the detectors 20, 24, 26. Since this residual light must twice go through almost all the optical elements of the system, its value is fairly low.

These control values are kept in memory for a later use: at a later time, we can once more turn on the third source 34 to read a new value of the control signals $s_{c0}(t)$, $s_{c1}(t)$ and $s_{c2}(t)$. Using the values kept in memory, we can obtain the correction factors:

$$\gamma_0(t) = \frac{s_{c0}(t)}{s_{c0}(0)},\ \gamma_1(t) = \frac{s_{c1}(t)}{s_{c1}(0)}\text{ and }\gamma_2(t) = \frac{s_{c2}(t)}{s_{c2}(0)} \tag{18}$$

It follows that:

$$\frac{P(t)\alpha_s(t)}{\gamma_c(t)} = \frac{\frac{a}{\gamma_0(t)g_0(0)\beta_0(0)}s_0(t) + \frac{b}{\gamma_1(t)g_1(t)\beta_2(t)}s_1(t) + \frac{1}{\gamma_2(t)g_2(t)\beta_2(t)}s_2(t)}{\frac{a\alpha_0}{\beta_0} + \frac{b\alpha_1}{\beta_1} + \frac{\alpha_2}{\beta_2}} \tag{19}$$

where $\gamma_c(t)=\alpha_c(t)/\alpha_c(0)$ The value of $\gamma_c(t)$ will never be known directly. It is only intended to be used within the value found in eq. (18) to compute the ac values of the signals:

$$s_{ac0}(\Delta d, t) = \frac{s_0(\Delta d, t) - \gamma_0(t)g_0(0)\alpha_0(0)\frac{P(t)\alpha_s(t)}{\gamma_c(t)}}{\gamma_0(t)g_0(0)\beta_0(0)} \tag{20}$$

$$= -\frac{1}{2}\frac{P(t)\beta_s(t)}{\gamma_c(t)}\cos\left(\frac{4\pi\Delta d(t)}{\lambda_0}\right)e^{-\left(\frac{2\Delta d(t)}{l_c}\right)^2}$$

and $$s_{ac1}(\Delta d, t) = \frac{s_1(\Delta d, t) - \gamma_1(t)g_1(0)\alpha_1(0)\frac{P(t)\alpha_s(t)}{\gamma_c(t)}}{\gamma_1(t)g_1(0)\beta_1(0)} \tag{21}$$

$$= -\frac{1}{2}\frac{P(t)\beta_s(t)}{\gamma_c(t)}\sin\left(\frac{4\pi\Delta d(t)}{\lambda_0}\right)e^{-\left(\frac{2\Delta d(t)}{l_c}\right)^2}$$

And the same normalization proposed in eq. (13) and (14) can be applied here to recover the properly scaled quadrature signals.

Figure 7:
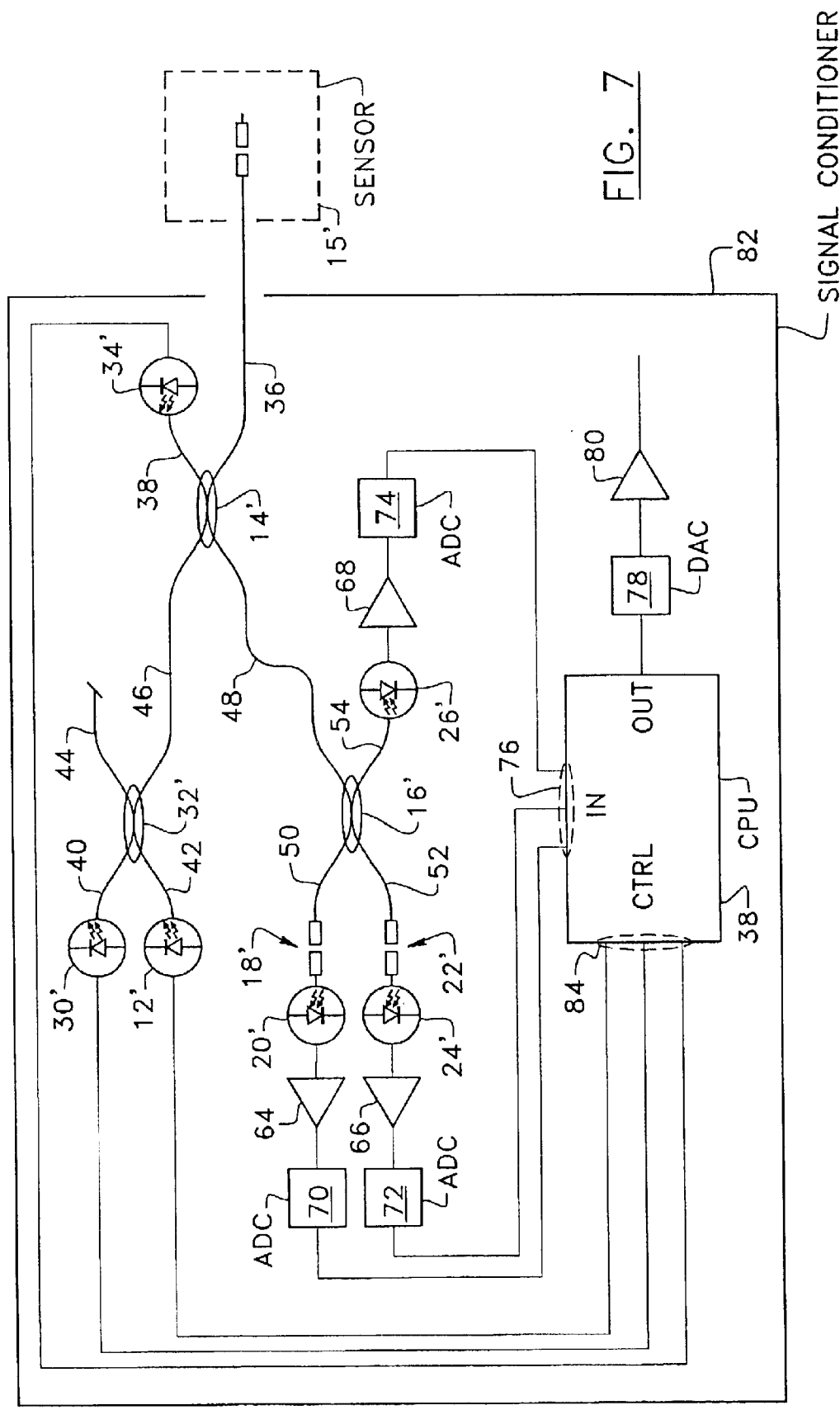
FIG. 7 is a schematic diagram illustrating a construction of an absolute system according to the present invention.

Referring to FIG. 7, there is shown a practical implementation of the fast, absolute demodulation system according to the present invention, for an optical fiber sensor application. The system is used as an instrument for measuring a pressure of a gas or a liquid. It should be understood that the system according to the present invention is by no means limited to such use or application.

The schematically illustrated system has the same configuration as the one presented in FIG. 3, except for the light paths and bulk beam splitters which have been replaced by multimode fiber 36 (50 μm core diameter) and matching multimode optical fiber couplers 14', 16', 32' (50:50 splitting ratio). And instead of using Michelson-type interferometers, low-finesse Fabry-Pérot interferometers 15', 18', 22' are used. It should be noted that a similar arrangement could be constructed with single-mode fibers and couplers or even with bulk optics.

The three light sources 12', 30', 34' may consist of standard telecommunication-grade LED's. They can be purchased already packaged to receive a standard optical fiber connector. For example, the first light source 12' can consist of a LED model MF228 manufactured by the company Mitel, which has its central wavelength $\lambda_0$ at approximately 850 nm. LEDs model MF359 also manufactured by MITEL with $\lambda_0$ at around 780 nm can be also used for the second and third light sources 30', 34', with the third light source 34' used as the control source. Both types of LEDs have a spectral half-width of 50 nm and the power coupled inside a 50 µm fiber is about 60 µW. The system is provided with a central processing unit (CPU) 38 which controls the three light sources 12', 30', 34', selectively turning them on or off as needed through the control lines 84.

The connectorized lead fibers 40, 42 of the fiber optic coupler 32' are connected to the sources 12' and 30'. One output arm 44 of the coupler 32' is not used and terminated with an angle-cleaved end to minimize reflections. The other output fiber 46 is fusion-spliced to one arm of the coupler 14'. This fiber receives half of the light from the source 12' or 30' that is turned on at any moment. One of the opposite arm of the coupler 14' receives the optical fiber 36 that carries the light to and from the sensing interferometer 15'. The other arm 38 on the sensor side receives light from the control light source 34'. Standard fiber optic connectors can be used to connect the sensor 15' to the coupler 14'. The loss variations inherent to this connection method is not a problem here since the demodulation technique introduced with the present invention compensates for the variations of the optical signals received from the sensor.

Back to the first side (the reference side) of the coupler 14', light from either the control source 34' or from the sensor 15' is carried into the input fiber 48 of the coupler 16', again through a fusion splice. The optical signal is then divided in two approximately equal parts from the coupler 16' to the reference interferometers 18', 22'.

The reference interferometers 18', 22' consist of low-finesse Fabry-Pérot interferometers. The transfer function of a low-finesse Fabry-Pérot interferometer can be approximated by the standard two-arm interferometer function of eq. (2) and (3), provided that the reflectivity of each of the two facing mirrors is low enough. This will be the case here since mirrors of approximately 30% reflectivity are used. 20 The optical path difference (OPD) of a Fabry-Pérot etalon is equal to twice the optical distance separating the reflective surface of the two mirrors.

Figure 8:
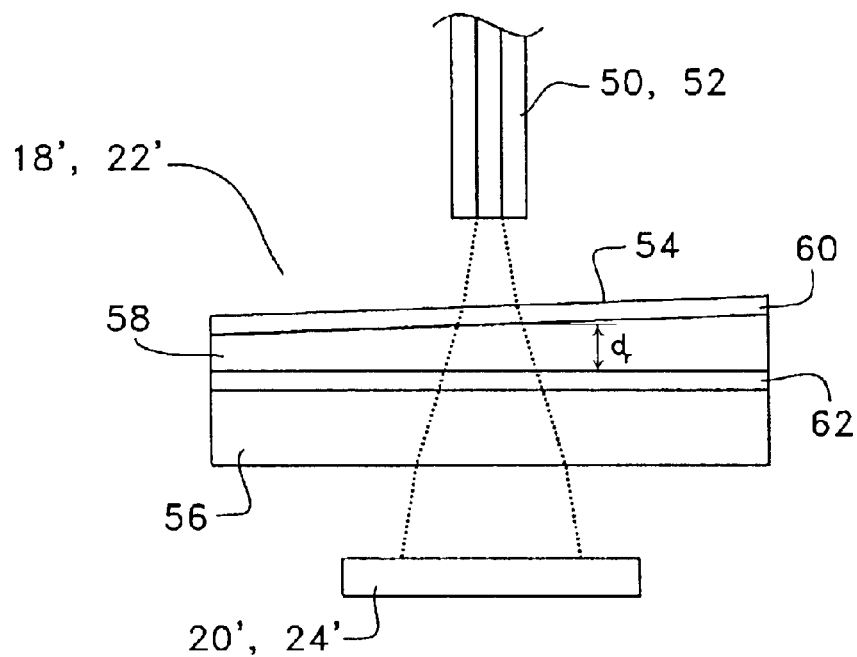
FIG. 8 is a schematic diagram illustrating a physical arrangement for the illumination of a thin-film Fizeau reference interferometer and detecting photodiode.

Referring also to FIG. 8, for the reference interferometers 18', 22', the best results can be achieved by a thin-film Fizeau interferometer (TFFI) deposited on a quartz substrate 56. The cavity is formed by a wedge-shaped layer of transparent material 58 sandwiched between two reflectors 60, 62. Here, the slope of the wedge is very small: its optical thickness varies from 10 µm to 25 µm over a transverse distance of 25 mm. So if the light is incident on only a small portion of this device, the illuminated portion will essentially act as a Fabry-Pérot interferometer. To build the reference interferometers, a few millimeters of the central portion of the TFFI are cut around the area where the local optical thickness of the sandwiched layer is around 15 µm. This provides very reliable and stable reference interferometers because of their small size and all-solid construction.

For each reference interferometer 18', 22', the cleaved end of the fiber 50, 52 bringing light from the sensing interferometer 15' (one of the output arms of the coupler 16') is placed in close proximity to the TFFI surface 54. The slowly varying thickness that the TFFI presents in front of the fiber core allows for a precise adjustment of the reference interferometer OPD. For the first reference interferometer 18', the position of the TFFI is adjusted such that the optical thickness in front of the optical fiber core is $d_{r0}$=15 µm (so its OPD is equal to 30 µm). For the second reference interferometer 22', the same arrangement with the second output fiber 52 of the coupler 16' is used, but this time the optical thickness $d_{r1}$ is adjusted to be higher by one eight of the central wavelength of the first optical source 12'.

This adjustment will give two signals in perfect quadrature when the first source 12' is used, but there will be an error in the phase of the two components when the second source 30' is used. During the signal processing, this will obviously result in a distortion of the normalized signals when the second source 30' is used since a perfect quadrature in eq. (13) and (14) is obtained only for the first source 12'. But in practice, this distortion leads to a maximum phase error of 0.1 radians at the outcome of the quadrature detection, or about 6 nm in the measurement of $d_s$.

The optical signal, after being modulated by the TFFI, is captured by the photo-detector 20' for the first reference interferometer 18' and the photo-detector 24' for the second reference interferometer 22'. A portion of the reflected signal from each TFFI will also be captured back in their incident fiber 50, 52. These reflected light signals are recombined on their trip back trough the coupler 16' and this composite signal is detected by the photo detector 26' that is directly attached to the remaining arm 54 of the coupler 16'.

The preferable choice of detector is a Si:PIN-type photodiode. To make sure it captures the whole beam issued from the fiber 50, 52 and through the TFFI, its area should be large enough, but in the same time, it should be kept as small as possible to keep its capacitance low and have a sufficient speed of response. Detectors model S5971 manufactured by the company Hamamatsu, which have an active area of 1.2 mm of diameter, can be conveniently used for this purpose.

The photodiode currents are converted to voltage swings ranging from −2.5 V to +2.5 V by transimpedance amplifiers 64, 66, 68 based around a FET-input op-amp. The −3 dB cut-off frequency of the photodiode-transimpedance amplifier assembly is at least 400 kHz. The output of each transimpedance amplifier 64, 66, 68 is digitized into 14-bits numbers by analog-to-digital converters (ADC) 70, 72, 74 at a maximum rate of 200 kHz. Those three digital signals are used as inputs 76 by the central processing unit 38 of the system to compute in real-time the OPD of the sensing interferometer 15' (which is proportional to a pressure in the example). The OPD value can finally be converted back into an electrical voltage with predetermined offset and scale factor, also in real-time through a digital-to-analog converter 78 and an amplifier 80. With proper calibration of the sensor OPD, the operator can thus have a real-time measurement of the pressure by simply measuring the voltage output of the signal conditioner 82.

Figure 9:
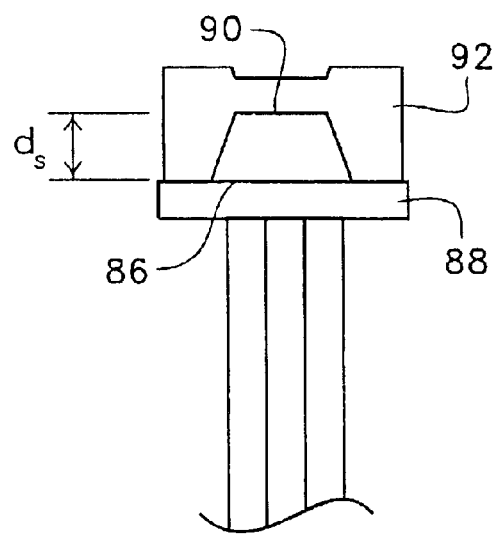
FIG. 9 is a schematic diagram illustrating a construction of an optical fiber pressure sensor acting as a sensing interferometer according to the present invention.

Referring to FIG. 9, there is shown a possible embodiment of a pressure-sensing interferometer which can be used as sensing interferometer 15' for the above example. Light from the optical fiber 36 (see FIG. 7) is injected inside a miniature Fabry-Pérot cavity defined by a first reflector 86 composed of a thin-film partial reflector (about 30% reflectivity) surface deposited on a glass disc 88, and a second reflector 90 formed by the flat surface (also 30% reflectivity) of a silicon construct 92 that has been selectively etched. The silicon construct 92 is soldered by an anodic-bonding process under vacuum to the glass disk 88 so that the cavity between the two mirrors 86, 90 is hermetically sealed. The small thickness (approximately 10 µm) of the etched silicon surface makes this device very sensitive to the external pressure. At a normal pressure of 1 bar, the spacing $d_s$ between the silicon surface 90 and the glass surface 86 is about 17 µm. But when the external pressure increases, the silicon surface 90 yields to the applied force toward the glass surface 86 at a rate of approximately 0.05 µm/bar. The exact variation of the cavity length with respect to pressure can be calibrated, so that a measurement of $d_s$ can be translated to a pressure value.

There are several other types of sensors that can also be used with the present invention. And this is not restricted to Fabry-Perot interferometers. The sensing interferometer 15 can be of any type as long as its OPD matches the OPD of the reference interferometers 18, 22 to within approximately once the coherence length of the light source 12', and the OPD variation of the sensor 15 can be precisely calibrated against the physical parameter to be measured. Other types of sensors include, for example, a fiber Mach-Zehnder interferometer for vibration or sound detection, a bulk Michelson interferometer for position detection, etc.

Before being able to demodulate the optical signal from the sensor 15, the fixed parameters used in the real-time calculations must be determined. This is accomplished by doing a calibration run. The calibration run is made by acquiring the data from the three detectors 20, 24, 26 when the sensor OPD varies along a significant portion of its range. More precisely, one has to make sure the OPD of the sensor 15 varies on a range that is at least equal to half the wavelength of the light source 12 used. This ensures that each signal goes trough at least one complete cycle, i.e. one maximum and one minimum. The following calibration procedure that must be performed with the source 12 should be repeated with the source 30 to obtain a parallel set of calibration parameters.

Practically, this can be done with whatever sensor compatible with the instrument. In the following example illustrating a typical calibration run, a pressure sensor is used. The sensor 15 is placed in a pressure chamber (not shown) and the pressure of the chamber is raised to approximately 40 bars. At this moment, the Fabry-Pérot cavity length of the sensor 15 will then be 17–40×0.05=15 μm. The data acquisition is then started during a certain time during which the pressure in the chamber is progressively released to zero. During this time, the cavity length of the sensor 15 will thus undergo a variation from 15 μm to 17 μm. The signals $s_0$, $s_1$, $s_2$ acquired for the three detectors 18, 22, 26 within the instrument will look like those illustrated in FIG. 10. It is not required to monitor the pressure during the calibration run. It is even not necessary to ensure a linear pressure decrease rate. All is needed for the calibration run is a reading of the detectors 18, 22, 26 as the sensor 15 varies.

Figure 10:
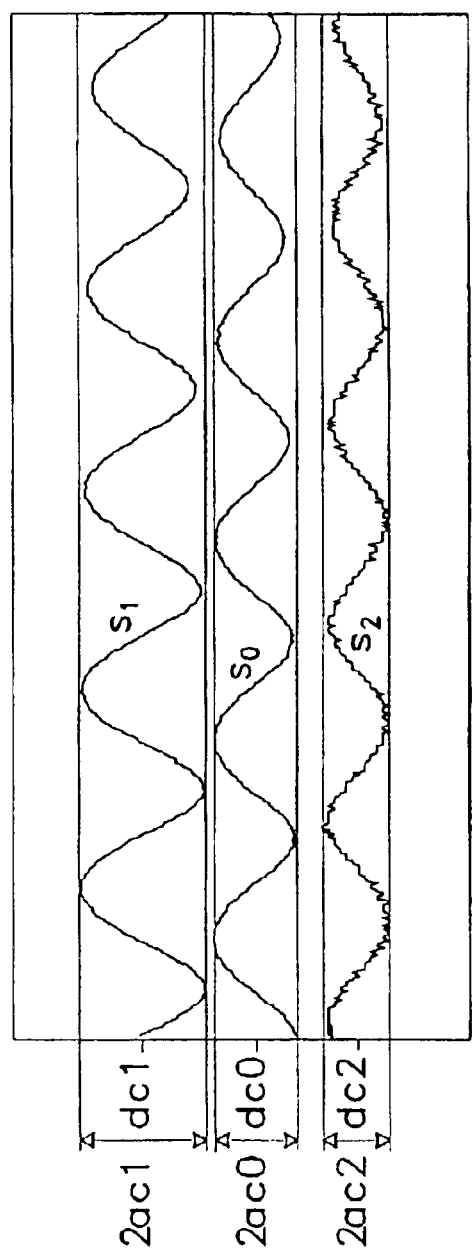
FIG. 10 is a graph showing typical signals acquired during a calibration run of the system according to the present invention.

From each of the signals $s_0$, $s_1$, $s_2$ acquired, their ac and dc components are first derived. As illustrated in FIG. 10, the ac parameter ($ac_0$ for the first detector 18, $ac_1$ for the second detector 22, $ac_2$ for the third detector 26) is equal to the difference of the maximum value and the minimum value divided by two. The dc parameter ($dc_0$ for the first detector 18, $dc_1$ for the second detector 22, $dc_2$ for the third detector 26) is equal to the average of the maximum value and the minimum value.

Looking at eq. (7), (8) and (9), it is clear that the dc and ac parameters can be related to the factors $g_i p \alpha_i \alpha_s$ and $\tfrac{1}{2} g_i P \beta_i \beta_s$ respectively, where i is 0, 1 or 2. They thus depend on the characteristic of the reference interferometers 18, 22 and also of the sensing interferometer 15 used for the calibration. But this is not a problem since the normalisations introduced by eq. (19), (20), (21), (13) and (14) will effectively remove the common factors $\alpha_s$ and $\beta_s$ that depend on the sensor 15.

The next step in the calibration process is to normalize each signal acquired with a calculus analogous to eq. (11) and (12) by using the ac and dc values just calculated. This will lead to three signals of the form:

$$\frac{s_0(f(\Delta d)) - dc0}{ac0} = \cos\left(\frac{4\pi f(\Delta d)}{\lambda_0}\right) e^{-\left(\frac{2f(\Delta d)}{l_c}\right)^2} \quad (22)$$

$$\frac{s_1(f(\Delta d)) - dc1}{ac1} = \sin\left(\frac{4\pi f(\Delta d)}{\lambda_0}\right) e^{-\left(\frac{2f(\Delta d)}{l_c}\right)^2} \quad (23)$$

$$\frac{s_2(f(\Delta d)) - dc2}{ac2} = \quad (24)$$

$$a\cos\left(\frac{4\pi f(\Delta d)}{\lambda_0}\right) e^{-\left(\frac{2f(\Delta d)}{l_c}\right)^2} + b\sin\left(\frac{4\pi f(\Delta d)}{\lambda_0}\right) e^{-\left(\frac{2f(\Delta d)}{l_c}\right)^2}$$

To find the correct values of a and b, a least-square method can be used to fit the weighted addition of normalized signals (22) and (23) to the normalized composite signal (24).

Finally, in the last step of the calibration procedure, the third source 34 is used (the first and second sources 12, 30 are turned off) to get the reference control signals $s_{c0}(0)$, $s_{c1}(0)$ and $s_{c2}(0)$ that will be used later to get the correction factors of eq. (18).

To recap, the following calibration parameters that will be used in the real-time signal processing described below are now available: a set of $dc_0$, $dc_1$, $dc_2$, $ac_0$, $ac_1$, $ac_2$, a and b for each of the sources 12, 30, and a set $s_{c0}(0)$ $s_{c1}(0)$ and $s_{c2}(0)$ to get the correction factors from the third source 34 from time to time. The values of $\lambda_0$, $\lambda_1$ and $d_{r0}$ are still needed and these can be measured by external means (using an optical spectrum analyser).

Referring to FIG. 3, a practical measurement session proceeds, for example, according to the general procedure which involves the following steps.

First, the sensor 15 is connected to the signal conditioner 82, and the signal conditioner 82, acting as a demodulator, is reset. The first, second and third light sources 12, 30, 34 are shut off and the zero values $s_{z0}$, $s_{z1}$ and $s_{z2}$ (calibration parameters) are acquired from the detectors 20, 24, 26 (e.g. by the CPU 38 as shown in FIG. 7). This provides a dark offset value that is subtracted from all subsequent acquisitions of the detectors 20, 24, 26.

Next, the third light source 34 is lit and the control signals $s_{c0}(t)$, $s_{c1}(t)$ and $s_{c2}(t)$ produced by the detectors 20, 24, 26 are acquired. Dividing these values with the calibration parameters $s_{c0}(0)$, $s_{c1}(0)$ and $s_{c2}(0)$ measured previously provides the correction factors $\gamma_0(t)$, $\gamma_1(t)$ and $\gamma_2(t)$ as defined in eq. (18). These factors will be used with the ac and dc calibration parameters for compensating eventual variations within the demodulator (especially changes in the coupling ratio of the coupler 16).

The third light source 34 is then switched off as the second light source 30 is switched on (the first light source 12 remains off). The phase $\phi_1(0)$ is then measured (with the second light source 30).

The second light source 30 is then switched off as the first light source 12 is switched on (the third light source 34 remains off). The phase $\phi_0(0)$ is then measured (with the first light source 12).

In these two steps, a one-time measurement of the phase of the signals $\phi_0(0)$ and $\phi_1(0)$ with each light source 30 and 12 is taken using the signal processing sequence described hereinafter.

The initial fringe order $n_0(0)$ can then be found from $\phi_0(0)$ and $\phi_1(0)$ by solving the set of equations represented in eq. (16) with the methodology described earlier. At this stage, an initial value of $d_s(0)$ to start with is obtained. Or more precisely, an absolute value of the fringe order $n_0$ that solves eq. (16) is obtained.

During real-time measurement, the first light source 12 is kept on while the second and third light sources 30, 34 are shut off. The phase $\phi_0(t)$ is measured with the first source 12 and a change in the fringe order is monitored. The relative changes in the fringe order are thus measured. But knowing the initial value $n_0(0)$, the subsequent absolute values $d_s(t)$ can be obtained by a simple addition, using $\phi_0(t)$ and $n_0(t)$ to get the absolute value $d_s(t)$ from eq. (16).

The value of $d_s(t)$ is finally converted into an electrical voltage (with predetermined offset and scale factor) for real-time output (e.g. by the DAC 78 and the amplifier 80 shown in FIG. 7). With proper calibration of the sensor OPD, the operator can thus have a real-time measurement of the pressure or the other measured physical parameter by simply measuring the voltage output of the signal conditioner 82.

The phase detection sequence used in the above steps can be decomposed into the following procedure: acquisition of signals $s_0(t)$, $s_1(t)$ and $s_2(t)$; subtraction of the dark offsets; normalization; and quadrature detection.

The first two steps are quite straightforward and imply the use of the dark offset values measured during the reset step to compensate for any stray light that could have penetrated the system.

The next important step is to normalize the signals so that we end up with properly scaled cos( ) and sin( ) signals for the quadrature detection. The real-time dc value must be known, which is computed with an equation similar to eq. (19):

$$DC(t) = \frac{\frac{a}{\gamma_0(t)ac0}s_0(t) + \frac{b}{\gamma_1(t)ac1}s_1(t) + \frac{1}{\gamma_2(t)ac2}s_2(t)}{a\frac{dc0}{ac0} + b\frac{dc1}{ac1} + \frac{dc2}{ac2}} \quad (25)$$

where the correction factors $\gamma_0(t)$, $\gamma_1(t)$ and $\gamma_2(t)$ as defined in eq. (18) and which were measured at reset are used to compensate for the slow variations in the behaviour of the demodulator.

The real-time dc value can be used to isolate the ac portion of the signals using a calculus similar to eq. (20) and (21):

$$s_{ac0}(t) = \frac{s_0(t) - \gamma_0(t)dc0 DC(t)}{\gamma_0(t)ac0} \quad \text{and} \quad (26)$$

$$s_{ac1}(t) = \frac{s_1(t) - \gamma_1(t)dc1 DC(t)}{\gamma_1(t)ac1} \quad (27)$$

A last scaling is operated on the signals using the trigonometric property $\cos(x)^2 + \sin(x)^2 = 1$ as in eq. (13) and (14):

$$s_{n0}(t) = \frac{s_{ac0}(t)}{\sqrt{s_{ac0}(t)^2 + s_{ac1}(t)^2}} \quad \text{and} \quad (28)$$

$$s_{n1}(t) = \frac{s_{ac1}(t)}{\sqrt{s_{ac0}(t)^2 + s_{ac1}(t)^2}} \quad (29)$$

We now have two instantaneous values in quadrature in the form of cos( ) and sin( ) from which the phase value can be unambiguously determined from $-\pi$ to $+\pi$.

If the previous value $\phi_0$ is kept in memory, it can be used to monitor the changes in the fringe order, adding 1 to the current value of $n_0$ when the phase goes through a transition from $+\pi$ to $-\pi$, and deducting 1 from the current value of $n_0$ when the phase goes through a transition from $-\pi$ to $+\pi$. Using equation (16), we can hence have a value of the sensing interferometer's cavity length:

$$d_s = \frac{\lambda_0}{2}\left(\frac{\varphi_0}{2\pi} + n_0\right) + d_{r0} \quad (30)$$

The choice of measuring only the relative changes in real-time, keeping an absolute measurement only for the beginning of the acquisition, has the advantage of accelerating the acquisition rate by a factor of approximately two since only one quadrature detection is needed. But it has one limit: it requires that the maximum change in the sensor cavity length ds between two acquisitions is less than half a fringe 850÷4=212.5 nm in this example). If the rate is higher than this, it will no longer be possible to make the difference between a $+\pi$ to $-\pi$ transition and a $-\pi$ to $+\pi$ transition, thereby loosing all track of the fringe order $n_0$.

The system according the present invention can take various configurations.

Referring to FIG. 3, as explained above, a relative system is obtained with the source 12 (having a large spectrum), the two beam splitters 14, 16, the two reference interferometers 18, 22 (with their OPD being larger than the coherence length of the source 12 and being different from each other so that the optical signals are almost if not exactly in quadrature), and the three detectors 20, 24, 26. In this configuration, the light source 12 is preferably directly coupled to the beam splitter 14.

The internal perturbations of the demodulator 82 can be corrected through the additional use of the light source 34 (having also a large spectrum) if desired.

An absolute system can be obtained by the additional use of the light source 30 coupled to the beam splitter 32 inserted between the light source 12 and the beam splitter 14.

Referring to FIG. 4, a relative system can be also obtained with the detector 26 being coupled to the beam splitter 33 inserted between the light source 12 and the beam splitter 14 instead of being coupled to the beam splitter 16 as shown in FIG. 3. Again, the internal perturbations of the demodulator 82 can be corrected through the additional use of the light source 34.

While embodiments of the present invention have been illustrated in the accompanying drawings and described above, it will be evident to those skilled in the art that changes and modifications may be made therein without departing from the invention. For example, the beam splitter 32 can be replaced by an optical switch. The beam splitters 14, 16, 32, 33 can be optical fiber couplers. The reference interferometers 18, 22 can be of Fabry-Perot type, Fizeau type (thin layer or not) or any other suitable type. Fibers 36, 48, 46 can be of multimode or singlemode type. Light sources 12, 30, 34 can be centered around 850 nm, 1300 nm or 1550 nm. Sensing interferometers 34 and reference interferometers 18, 22 can be used in reflection or transmission. The system can be used as a signal conditioner for demodulating a "remote" interferometer used for the measurement of one or many physical parameters such as pressure, temperature, displacement, elongation, magnetic field, electric current to name only those.

What is claimed is:

1. A system for measuring an optical path difference in a sensing interferometer, comprising:

at least one light source connectable to the sensing interferometer;

a splitting means connectable to the sensing interferometer for splitting light reflected from the sensing interferometer into first and second beams;

a first reference interferometer connected to the splitting means for receiving the first beam, the first reference interferometer having a predetermined optical path difference;

a first detector connected to the first reference interferometer for producing a signal indicative of an intensity of light transmitted by the first reference interferometer;

a second reference interferometer connected to the splitting means for receiving the second beam, the second reference interferometer having a predetermined optical path difference;

a second detector connected to the second reference interferometer for producing a signal indicative of an intensity of light transmitted by the second reference interferometer;

a recombining means connected to the first and second reference interferometers, for recombining light reflected from the first and second reference interferometers; and a third detector connected to the recombining means for producing a signal indicative of an addition of light recombined by the recombining means;

said at least one light source having a coherence length substantially smaller than the optical path differences of the sensing and reference interferometers, and the optical path differences of the reference interferometers being different so that the signals produced by the detectors connected to the reference interferometers are substantially in quadrature, whereby the signals produced by the detectors are indicative of the optical path difference in the sensing interferometer.

2. The system according to claim 1, wherein the splitting means and the recombining means comprise a same beam splitter having a first arm adapted to receive the light reflected from the sensing interferometer, a second arm connected to the first reference interferometer, a third arm connected to the second reference interferometer, and a fourth arm connected to the third detector.

3. The system according to claim 2, further comprising a second beam splitter having a first arm connected to said at least one light source, a second arm connectable to the sensing interferometer, and a third arm connected to the beam splitter forming the splitting and recombining means.

4. The system according to claim 3, further comprising a calibration light source, and wherein the second beam splitter has a fourth arm connected to the calibration light source, the fourth arm being optically opposite to the third arm.

5. The system according to claim 1, wherein said at least one light source comprises first and second light sources having different central wavelengths and arranged to operate in alternation with each other.

6. The system according to claim 5, wherein the splitting means and the recombining means comprise a same beam splitter having a first arm adapted to receive the light reflected from the sensing interferometer, a second arm connected to the first reference interferometer, a third arm connected to the second reference interferometer, and a fourth arm connected to the third detector.

7. The system according to claim 6, further comprising a second beam splitter having a first arm connected to the light sources, a second arm connectable to the sensing interferometer, and a third arm connected to the beam splitter forming the splitting and recombining means.

8. The system according to claim 7, further comprising a third beam splitter having first and second arms respectively connected to the first and second light sources, and a third arm connected to the first arm of the second beam splitter.

9. The system according to claim 7, further comprising an optical switch coupled between the light sources and the first arm of the second beam splitter.

10. The system according to claim 7, further comprising a calibration light source, and wherein the second beam splitter has a fourth arm connected to the calibration light source, the fourth arm being optically opposite to the third arm.

11. The system according to claim 10, further comprising a third beam splitter having first and second arms respectively connected to the first and second light sources, and a third arm connected to the first arm of the second beam splitter.

12. The system according to claim 10, further comprising an optical switch coupled between the first and second light sources and the first arm of the second beam splitter.

13. The system according to claim 1, wherein said at least one light source has a wide spectrum.

14. The system according to claim 3, wherein at least one of the beam splitters comprises an optical fiber coupler.

15. The system according to claim 4, wherein at least one of the beam splitters comprises an optical fiber coupler.

16. The system according to claim 7, wherein at least one of the beam splitters comprises an optical fiber coupler.

17. The system according to claim 1, wherein at least one of the reference interferometers comprises a Fabry-Perot interferometer.

18. The system according to claim 1, wherein at least one of the reference interferometers comprises a Fizeau interferometer.

19. The system according to claim 18, wherein the Fizeau interferometer is of a thin layer type.

20. The system according to claim 1, further comprising:
    a processor having control lines connected to said at least one light source, input lines connected to the detectors, and an output line producing a signal indicative of the optical path difference in the sensing interferometer.

21. The system according to claim 1, further comprising a calibration light source coupled to the splitting means so that light produced by the calibration light source follows a same optical path as the light reflected from the sensing interferometer before reaching the detectors.

22. The system according to claim 21, further comprising:
    a processor having control lines connected to said at least one light source and the calibration light source, input lines connected to the detectors, and an output line producing a signal indicative of the optical path difference in the sensing interferometer;

and wherein:
    said at least one light source comprises two light sources having different central wavelengths; and
    the processor has an initiating mode for determining an initial fringe number and a measurement mode for monitoring a fringe order change and determining the optical path difference in the sensing interferometer.

23. A system for measuring an optical path difference in a sensing interferometer, comprising:
    at least one light source connectable to the sensing interferometer;
    a splitting means connectable to the sensing interferometer for splitting light reflected from the sensing interferometer into first, second and third beams;
    a first reference interferometer connected to the splitting means for receiving the first beam, the first reference interferometer having a predetermined optical path difference;
    a first detector connected to the first reference interferometer for producing a signal indicative of an intensity of light transmitted by the first reference interferometer;
    a second reference interferometer connected to the splitting means for receiving the second beam, the second reference interferometer having a predetermined optical path difference;
    a second detector connected to the second reference interferometer for producing a signal indicative of an intensity of light transmitted by the second reference interferometer; and
    a third detector connected to the splitting means, for producing a signal indicative of the third beam;

said at least one light source having a coherence length substantially smaller than the optical path differences of the sensing and reference interferometers, and the optical path differences of the reference interferometers being different so that the signals produced by the detectors connected to the reference interferometers are substantially in quadrature, whereby the signals produced by the detectors are indicative of the optical path difference in the sensing interferometer.

24. The system according to claim 23, wherein the splitting means comprises a beam splitter having a first arm adapted to receive the light reflected from the sensing interferometer, a second arm connected to the first reference interferometer, and a third arm connected to the second reference interferometer.

25. The system according to claim 24, wherein the splitting means further comprises a second beam splitter having a first arm connected to said at least one light source and the third detector, a second arm connectable to the sensing interferometer, and a third arm connected to the first arm of the beam splitter connected to the reference interferometers.

26. The system according to claim 25, further comprising a third beam splitter having a first arm connected to said at least one light source, a second arm connected to the first arm of the second beam splitter, and a third arm connected to the third detector.

27. The system according to claim 25, further comprising a calibration light source, and wherein the second beam splitter has a fourth arm connected to the calibration light source, the fourth arm being optically opposite to the third arm.

28. The system according to claim 26, further comprising a calibration light source, and wherein the second beam splitter has a fourth arm connected to the calibration light source, the fourth arm being optically opposite to the third arm.

29. The system according to claim 23, wherein said at least one light source comprises first and second light sources having different central wavelengths and arranged to operate in alternation with each other.

30. The system according to claim 29, wherein the splitting means comprises
   a first beam splitter having a first arm adapted to receive the light reflected from the sensing interferometer, a second arm connected to the first reference interferometer, and a third arm connected to the second reference interferometer; and
   a second beam splitter having a first arm connected to said at least one light source and the third detector, a second arm connectable to the sensing interferometer, and a third arm connected to the first arm of the beam splitter connected to the reference interferometers.

31. The system according to claim 30, further comprising a third beam splitter having a first arm connected to said at least one light source, a second arm connected to the first arm of the second beam splitter, and a third arm connected to the third detector.

32. The system according to claim 31, further comprising a fourth beam splitter having first and second arms respectively connected to the first and second light sources, and a third arm connected to the first arm of the third beam splitter.

33. The system according to claim 30, further comprising a calibration light source, and wherein the second beam splitter has a fourth arm connected to the calibration light source, the fourth arm being optically opposite to the third arm.

34. The system according to claim 31, further comprising a calibration light source, and wherein the second beam splitter has a fourth arm connected to the calibration light source, the fourth arm being optically opposite to the third arm.

35. The system according to claim 32, further comprising a calibration light source, and wherein the second beam splitter has a fourth arm connected to the calibration light source, the fourth arm being optically opposite to the third arm.

36. The system according to claim 34, further comprising an optical switch coupled between the light sources and the first arm of the third beam splitter.

37. The system according to claim 23, wherein said at least one light source has a wide spectrum.

38. The system according to claim 26, wherein at least one of the beam splitters comprises an optical fiber coupler.

39. The system according to claim 28, wherein at least one of the beam splitters comprises an optical fiber coupler.

40. The system according to claim 34, wherein at least one of the beam splitters comprises an optical fiber coupler.

41. The system according to claim 23, wherein at least one of the reference interferometers comprises a Fabry-Perot interferometer.

42. The system according to claim 23, wherein at least one of the reference interferometers comprises a Fizeau interferometer.

43. The system according to claim 42, wherein the Fizeau interferometer is of a thin layer type.

44. The system according to claim 23, further comprising:
   a processor having control lines connected to said at least one light source, input lines connected to the detectors, and an output line producing a signal indicative of the optical path difference in the sensing interferometer.

45. The system according to claim 23, further comprising a calibration light source coupled to the splitting means so that light produced by the calibration light source follows a same optical path as the light reflected from the sensing interferometer before reaching the detectors.

46. The system according to claim 45, further comprising:
   a processor having control lines connected to said at least one light source and the calibration light source, input lines connected to the detectors, and an output line producing a signal indicative of the optical path difference in the sensing interferometer;
and wherein:
   said at least one light source comprises two light sources having different central wavelengths; and
   the processor has an initiating mode for determining an initial fringe number and a measurement mode for monitoring a fringe order change and determining the optical path difference in the sensing interferometer.

47. A method of measuring an optical path difference in a sensing interferometer, comprising:
   directing light in the sensing interferometer;
   splitting light reflected from the sensing interferometer into first and second beams;
   directing the first beam into a first reference interferometer having a predetermined optical path difference;
   detecting an intensity of light transmitted by the first reference interferometer and producing a signal indicative of the intensity;
   directing the second beam into a second reference interferometer having a predetermined optical path difference;
   detecting an intensity of light transmitted by the second reference interferometer and producing a signal indicative of the intensity;
   recombining light reflected from the first and second reference interferometers; and
   detecting an addition of light resulting from the recombining and producing a signal indicative of the addition of light;

the light directed in the sensing interferometer having a coherence length substantially smaller than the optical path differences of the sensing and reference interferometers, and the optical path differences of the reference interferometers being different so that the signals based on the intensities of light transmitted by the reference interferometers are substantially in quadrature, whereby the signals are indicative of the optical path difference in the sensing interferometer.

48. The method according to claim 47, further comprising directing light through a same optical path followed by the light reflected from the sensing interferometer and passing through the reference interferometers without directing light in the sensing interferometer.

49. The method according to claim 47, wherein the directing of light in the sensing interferometer comprises using light successively having different central wavelengths.

50. A method of measuring an optical path difference in a sensing interferometer, comprising:

directing light in the sensing interferometer;

splitting light reflected from the sensing interferometer into first, second and third beams;

directing the first beam into a first reference interferometer having a predetermined optical path difference;

detecting an intensity of light transmitted by the first reference interferometer and producing a signal indicative of said intensity;

directing the second beam into a second reference interferometer having a predetermined optical path difference;

detecting an intensity of light transmitted by the second reference interferometer and producing a signal indicative of said intensity; and detecting an intensity of the third beam and producing a signal indicative of said intensity;

the light directed in the sensing interferometer having a coherence length substantially smaller than the optical path differences of the sensing and reference interferometers, and the optical path differences of the reference interferometers being different so that the signals based on the intensities of light transmitted by the reference interferometers are substantially in quadrature, whereby the signals are indicative of the optical path difference in the sensing interferometer.

51. The method according to claim 50, further comprising directing light through a same optical path followed by the light reflected from the sensing interferometer and passing through the reference interferometers without directing light in the sensing interferometer.

52. The method according to claim 50, wherein the directing of light in the sensing interferometer comprises using light successively having different central wavelengths.

* * * * *